(12) United States Patent
Burger et al.

(10) Patent No.: US 6,353,418 B1
(45) Date of Patent: Mar. 5, 2002

(54) HORN ANTENNA HAVING A DIELECTRIC INSERT WITH A WIDE-BASED CONE SECTION

(75) Inventors: Stefan Burger, Freiburg; Alexander Hardell, Lörrach, both of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/634,421

(22) Filed: Aug. 8, 2000

(30) Foreign Application Priority Data

Aug. 10, 1999 (EP) .............................. 99115733

(51) Int. Cl.[7] .............................................. H01Q 13/00
(52) U.S. Cl. ..................... 343/786; 343/703; 343/772; 333/21 A
(58) Field of Search ................. 343/703, 771, 343/772, 785, 786; 333/21 A, 26, 212; H01Q 13/00

(56) References Cited

U.S. PATENT DOCUMENTS

| | | | |
|---|---|---|---|
| 4,511,899 A | * | 4/1985 | Brooker ...................... 343/786 |
| 5,117,240 A | * | 5/1992 | Anderson et al. ........... 343/786 |
| 5,426,443 A | * | 6/1995 | Jenness .................. 343/781 P |
| 5,550,553 A | | 8/1996 | Yamaki et al. ............... 343/785 |
| 5,880,698 A | | 3/1999 | Burger ........................ 343/772 |
| 6,097,348 A | * | 8/2000 | Chen et al. .................. 343/840 |

FOREIGN PATENT DOCUMENTS

| | | |
|---|---|---|
| DE | 4405855 | 2/1994 |
| EP | 0922942 | 6/1999 |
| EP | 0971213 | 1/2000 |

* cited by examiner

Primary Examiner—Tho Phan
(74) Attorney, Agent, or Firm—Bose McKinney & Evans LLP

(57) ABSTRACT

An antenna for transmitting microwaves is provided, which radiates microwaves to be transmitted as far as possible uncorrupted into free space and operates in a low-loss manner, having a circular waveguide (13) short-circuited at the end on one side, in which circular waveguide a transmitting element (15, 33) for feeding in microwaves is arranged, a funnel-shaped horn (25) adjoining an open end of the circular waveguide (13), the radius of which horn increases in the direction facing away from the circular waveguide, and an insert (27) made of a dielectric, which insert has a first cylindrical section (29), which fills the circular waveguide (13), and which insert has a conical section (31), whose tip points in the direction facing away from the circular waveguide and whose base area has a diameter which is greater than a diameter of the cylindrical section (29).

6 Claims, 2 Drawing Sheets

HORN ANTENNA HAVING A DIELECTRIC INSERT WITH A WIDE-BASED CONE SECTION

FIELD OF THE INVENTION

The invention relates to an antenna for transmitting microwaves, having a circular waveguide short-circuited at the end on one side, in which circular waveguide a transmitting element for feeding in microwaves is arranged, a funnel-shaped horn adjoining an open end of the circular waveguide, the radius of which horn increases in the direction facing away from the circular waveguide, and an insert made of a dielectric, which insert has a first cylindrical section, which fills the circular waveguide, and which insert has a conical section, whose tip points in the direction facing away from the circular waveguide.

BACKGROUND AND SUMMARY OF THE INVENTION

Such antennas, which are usually referred to as horn antennas, are used e.g. in filling level measuring technology for determining a filling level of a charge material in a container. In this case, microwaves are transmitted by means of an antenna to the surface of a charge material and the echo waves reflected at the surface are received. It goes without saying that an antenna used for transmission can likewise be used for reception. An echo function which represents the echo amplitudes as a function of the distance is formed, and from this the probable useful echo and the propagation time thereof are determined. The distance between the charge material surface and the antenna is determined from the propagation time.

In order to determine the filling level, it is possible to use all the known methods which enable comparatively short distances to be measured by means of reflected microwaves. The best known examples are pulsed radar and frequency modulated continuous wave radar (FMCW radar).

In the case of pulsed radar, short microwave transmission pulses, referred to below as wave packets, are transmitted periodically, are reflected from the charge material surface and, after a distance-dependent propagation time, are received again. The received signal amplitude as a function of time constitutes the echo function. Each value of this echo function corresponds to the amplitude of an echo reflected at a specific distance from the antenna.

In the case of the FMCW method, a continuous microwave is transmitted, said microwave being periodically linearly frequency-modulated, for example according to a sawtooth function. The frequency of the received echo signal therefore has a frequency difference with respect to the instantaneous frequency of the transmission signal at the instant of reception, said frequency difference depending on the propagation time of the echo signal. The frequency difference between the transmission signal and the reception signal, which can be obtained by mixing the two signals and evaluating the Fourier spectrum of the mixed signal, thus corresponds to the distance between the reflecting surface and the antenna. Furthermore, the amplitudes of the spectral lines of the frequency spectrum which is obtained by Fourier transformation correspond to the echo amplitudes. This Fourier spectrum therefore constitutes the echo function in this case.

In the case of conventional horn antennas, reflections frequently occur within the antennas. Reflections lead to alteration of the microwaves to be transmitted, e.g. to a short microwave pulse that is to be transmitted being artificially lengthened. Furthermore, these undesired reflections bring about an increase in the signal background and, consequently, a deterioration in the signal/noise ratio.

Microwaves to be transmitted may also be altered by virtue of different microwave modes and/or components of a microwave signal or microwave packet having a different frequency propagating at different speeds in the coupling-in region and/or in the horn. This can also result e.g. in the widening of a short microwave pulse.

Together with the horn, the conical section of the insert effects a comparatively continuous transition of the impedances from the circular waveguide through to free space. This matching can be considerably improved by the choice of a suitable material for the insert, but it is not completely loss-free even then.

DE-U 298 12 024 describes an antenna for transmitting microwaves, having
    a circular waveguide short-circuited at the end on one side,
        in which circular waveguide a transmitting element for feeding in microwaves is arranged,
    a funnel-shaped horn adjoining an open end of the circular waveguide,
        the radius of which horn increases in the direction facing away from the circular waveguide, and
    an insert made of a dielectric,
        which insert has a first cylindrical section,
            which fills the circular waveguide, and
        which insert has a conical section,
            whose tip points in the direction facing away from the circular waveguide In order to improve the signal quality of the antenna, in the case of this antenna the horn was arranged at a distance from the conical section.

An object of the invention is to specify an antenna which radiates microwaves to be transmitted as far as possible uncorrupted into free space and which operates in a low-loss manner.

To that end, the invention consists in an antenna for transmitting microwaves, having
    a circular waveguide short-circuited at the end on one side,
        in which circular waveguide a transmitting element for feeding in microwaves is arranged,
    a funnel-shaped horn adjoining an open end of the circular waveguide,
        the radius of which horn increases in the direction facing away from the circular waveguide, and
    an insert made of a dielectric,
        which insert has a first cylindrical section,
            which fills the circular waveguide, and
        which insert has a conical section,
            whose tip points in the direction facing away from the circular waveguide and
            whose base area has a diameter which is greater than a diameter of the cylindrical section.

In accordance with one refinement of the invention, the horn is at a distance from the conical section in the radial direction.

In accordance with one development of the invention, a second cylindrical section is arranged between the first cylindrical section and the conical section, and the diameter of said second cylindrical section is equal to the diameter of the base area of the conical section.

In accordance with one refinement of the invention, the conical section has in the axial direction a length which is approximately equal to the wavelength of microwaves to be transmitted in free space.

The invention and its advantages will now be explained in more detail with reference to the figures of the drawing, which illustrate two exemplary embodiments; identical parts are provided with identical reference symbols in the figures.

DETAILED DESCRIPTION OF EXEMPLARY EMBODIMENTS

Figure 1:
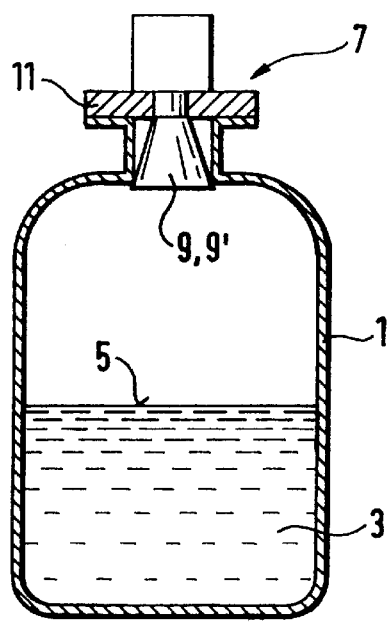
FIG. 1 shows an arrangement for measuring the filling level with a filling level measuring instrument which operates with microwaves.

FIG. 1 illustrates an arrangement for measuring the filling level as an exemplary application of antennas according to the invention. The arrangement comprises a container 1, in which a charge material 3 is situated. A filling level 5 of said charge material 3 is to be measured. To that end, a filling level measuring instrument 7 which operates with microwaves is arranged on the container 1. The filling level measuring instrument 7 preferably has an antenna according to the invention, by means of which microwaves can be transmitted in the direction of the charge material and microwaves reflected at the surface of the charge material can be received. This is e.g. an antenna 9 illustrated in FIG. 2 or an antenna 9' illustrated in FIG. 3. The filling level measuring instrument 7 is fastened on the container 1 by means of a flange 11.

Figure 2:
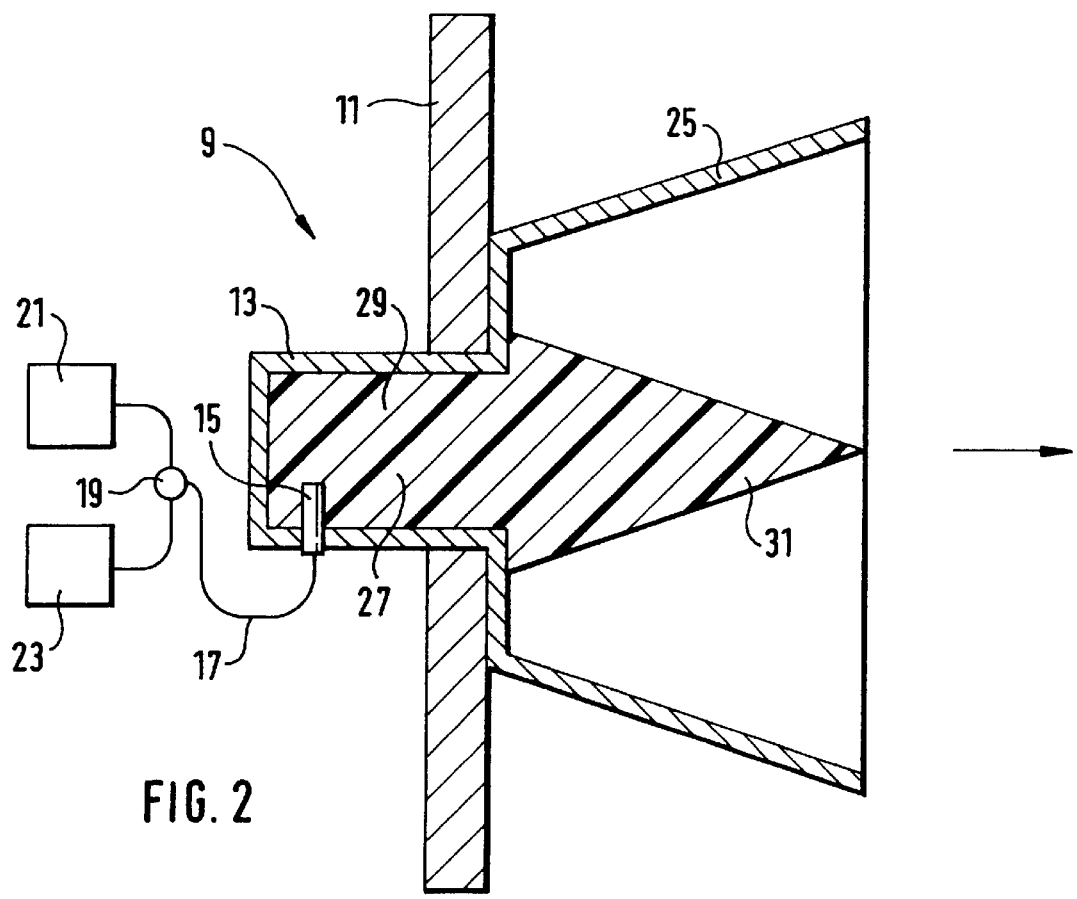
FIG. 2 shows an antenna with an insert having a first cylindrical section and a conical section.

FIG. 2 shows a section through a first exemplary embodiment of an antenna 9 according to the invention for transmitting microwaves. This antenna 9 can, of course, also receive microwaves. The antenna 9 has a hollow cylinder and a rear wall which terminates the hollow cylinder. Hollow cylinder and rear wall together form a circular waveguide 13 short-circuited at the end on one side.

A transmitting element 15 for feeding in and for picking up microwaves is arranged laterally in the circular waveguide 13. In the exemplary embodiment shown, the transmitting element 15 is a metallic pin connected to a transmitting and receiving selector 19 via a coaxial line 17.

The transmitting and receiving selector 19 is connected to a microwave source 21 and to a receiving circuit 23. If the antenna 9 is intended to be used exclusively for transmission, the transmitting and receiving selector 19 and the receiving circuit 23 can be omitted. If it is intended to serve only for reception, the transmitting and receiving 3elector 19 and the microwave source 21 can be omitted.

The microwave source 21 is, for example, a pulsed radar device, an FMCW device or a continuously oscillating microwave oscillator.

In the receiving circuit 23, an echo signal reflected from the charge material is picked up and made accessible for further processing.

An open end of the circular waveguide 13 is adjoined by a funnel-shaped horn 25. A radius of the horn 25 increases in the direction facing away from the circular waveguide. Microwaves are transmitted in said direction facing away from the circular waveguide. This is indicated by an arrow.

The circular waveguide 13 and the horn 25 are composed of an electrically conducting material, e.g. of aluminum or a high-grade steel, or of a plastic coated with a conductive material.

An insert 27 made of a dielectric is arranged in the antenna 9. Suitable dielectrics are e.g. fluoroplastics such as e.g. polytetrafluoroethylene (PTFE), ceramics or polyphenylene sulfide (PPS).

The insert 27 has a first cylindrical section 29, which fills the circular waveguide 13. The first cylindrical section 29 only has a recess for accommodating the transmitting element 15.

The first cylindrical section 29 is adjoined by a conical section 31. The first cylindrical section 29 and the conical section 31 are arranged with respect to one another in such a way that their axes of rotational symmetry coincide. The conical section 31 has a tip pointing in the direction facing away from the circular waveguide.

According to the invention, the properties of the antenna 9 are considerably improved by a base area of the conical section 31 having a diameter which is greater than a diameter of the cylindrical section 29. The dielectric is thus widened at the transition from the circular waveguide 13 to the horn 25. Measurements have shown that even a slight widening results in significantly fewer antenna-dictated losses. One reason for this is that the widening results in better impedance matching at the transition from the circular waveguide 13 to the horn 25.

A further improvement is produced if the horn 25, as illustrated in FIG. 2, is arranged at a distance from the conical section 31 in the radial direction over the entire length of said horn. This reduces reflections occurring in the region of the antenna 9.

Figure 3:
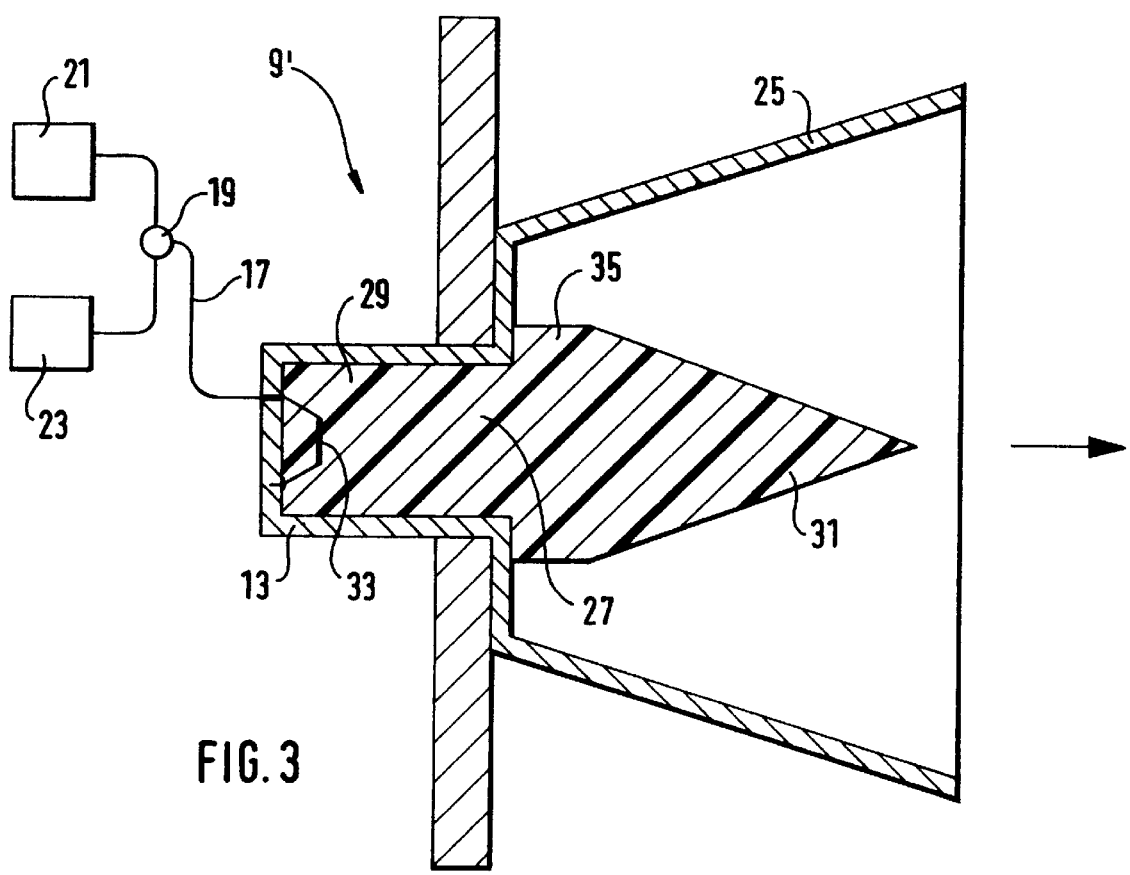
FIG. 3 shows an antenna in accordance with FIG. 1, in which a second cylindrical section is provided between the first cylindrical section and the conical section.

FIG. 3 illustrates a further exemplary embodiment of an antenna 9' according to the invention. On account of the extensive correspondence to the exemplary embodiment illustrated in FIG. 2, only the differences are described in more detail below.

In the case of the exemplary embodiment illustrated in FIG. 3, a transmitting wire serves as transmitting element 33. Said wire is arranged on the rear wall of the circular waveguide 13 and is composed of a conductive metal, e.g. made of copper, silver or aluminum. A first end of the transmitting wire is electrically conductively connected to an inner conductor of the coaxial line 17 via a bushing, e.g. a glass bushing. An outer conductor of the coaxial line 17 is electrically conductively connected to the rear wall of the circular waveguide 13. The rear wall performs the function of an outer conductor in the case of this coaxial bushing. A second end of the transmitting wire is electrically conductively connected, e.g. soldered, to the rear wall of the circular waveguide 13. Instead of the transmitting wire, it is also possible, of course, to use the metallic pin illustrated in FIG. 1.

The essential difference from the exemplary embodiment illustrated in FIG. 2 consists in the fact that, in the case of the insert 27, a second cylindrical section 35 is arranged between the first cylindrical section 29 and the conical section 31. The second cylindrical section 35 has a diameter which is equal to the diameter of the base area of the conical section 31. Even a very short second section 31 suffices to significantly reduce the power loss of the antenna 9'. In the case of an antenna 9' in which the circular waveguide 13 has an internal diameter of 22 mm, the base area of the conical section 31 has a diameter of 25 mm, the insert is composed of polyphenylene sulfide (PPS) and the microwaves to be transmitted have frequencies in the range of from 5 GHz to 10 GHz, e.g. a length of 5 mm is sufficient to attain an increase in the transmission power.

On account of the widening of the diameter of the insert 27 at the transition from the cylindrical section 29 to the conical section 31, both the horn 25 and the conical section 31 may have a shorter length than is possible in the case of conventional antennas. In the case of antennas according to the invention, it suffices if both the horn 25 and the conical section 31 have in the axial direction a length which is approximately equal to the wavelength of the microwaves to be transmitted in free space. If the microwaves to be transmitted have not only a frequency but a frequency spectrum, then an average frequency is taken as a basis for determining the wavelength. This small axial length is advantageous e.g. when a material whose mechanical properties do not readily allow an arbitrary length is used as material for the insert 27. This is the case with ceramic, for example.

Figure 4:
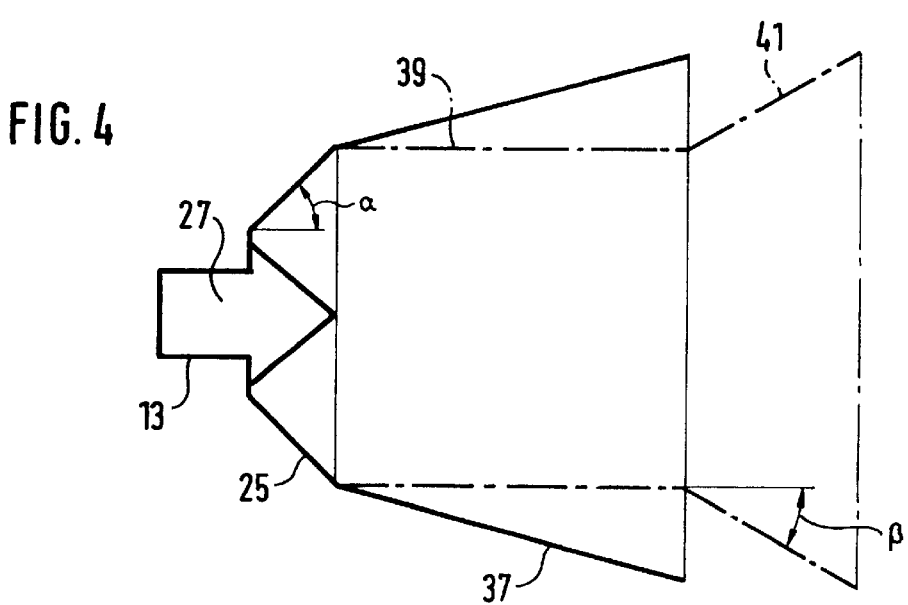
FIG. 4 shows an antenna with an air-filled waveguide.

If permitted by the space conditions at the site of use, it is possible, in the case of the antennas according to the invention, to arrange an air-filled waveguide in extension of the horn 25 at the transition from the antenna into free space. FIG. 4 schematically shows two exemplary embodiments of this. The air-filled waveguide is e.g. a further funnel-shaped horn 37 or a tubular circular waveguide 39 depicted by broken lines. An end of the circular waveguide 39 remote from the antenna may be adjoined by a further funnel 41, which is likewise depicted by broken lines in FIG. 4. An aperture angle α of the horn 25 and an aperture angle β of the funnel 41 may differ depending on the dielectric properties of the material of the insert 27. This enables optimum impedance matching both in the case of the transition from the material-filled circular waveguide 13 to the air-filled waveguide and in the case of the transition from the air-filled waveguide in-o free space.

In coaxial lines, electromagnetic waves propagate without dispersion in the transverse electromagnetic mode (TEM mode). This field mode is therefore particularly well suited to transporting wave packets or electromagnetic waves whose frequencies have a bandwidth. The advantage of dispersion-free propagation is particularly important when the waves or wave packets to be transmitted have the abovementioned bandwidth of their frequencies. Wave packets which are fed in then experience practically no widening. In the case of linearly frequency modulated microwaves, any deviation from linearity is largely avoided.

However, those modes which exhibit a radiation characteristic with a pronounced forward lobe are better suited to the directional transmission of electromagnetic waves by means of an antenna. This property is exhibited by the transverse electrical 11 mode (TE-11), which is capable of propagation in circular waveguides. Mode conversion is effected in the circular waveguide 13 in order that the essential proportion of the microwave energy generated is transmitted in the desired direction.

Depending on the dimensions of the circular waveguide, there is a frequency range in which the TE-11 mode is the only mode capable of propagation. Above this frequency range, higher modes, e.g. the TM-01 mode, which are less well suited to the directional transmission of microwaves are also capable of propagation. The frequency range is bounded by the cut-off frequency of the TE-11 mode toward low frequencies and by the cut-off frequency of the TM-01 mode toward high frequencies.

The circular waveguide 13 is adjoined by the horn 25, which is only partially filled by the insert 27. On account of the geometry of horn 25 and insert 27 inside the horn 25 and the fact that the horn 25 is only partially filled by a dielectric, hybrid modes assigned to the above modes form in the region of the horn 25. These are the HE-11 mode and the EH-01 mode.

The widening, according to the invention, of the diameter of the insert 27 at the transition from the cylindrical section 29 to the conical section 31 has the overall effect, for the antenna 9, 9', of lowering the cut-off frequency of the HE-11 hybrid mode and raising the cut-off frequency of the EH-01 hybrid mode. The frequency range in which only the HE-11 mode is capable of propagation is thus larger than in the case of conventional antennas.

With the dimensions specified above and the specified material for the insert 29 of the antenna 9' of FIG. 3, the cut-off frequency is approximately 3.5 GHz for the HE-11 hybrid mode and approximately 11 GHz for the EH-01 hybrid mode. The sparing between the two frequencies is approximately 7.5 GHz. If, by contrast, the base area of the conical section 31 had the same diameter as the cylindrical section 29, then the cut-off frequency would be approximately 4.8 GHz for the HE-11 hybrid mode and approximately 7 GHz for the EH-01 hybrid mode. The spacing between the two frequencies is then merely approximately 2.2 GHz. The widening of the diameter thus constitutes a considerable improvement with regard to the frequency range which can be utilized for directional radiation.

What is claimed is:

1. An antenna for transmitting microwaves, comprising:
    a circular waveguide short-circuited at the end on one side;
    a transmitting element for feeding in microwaves positioned in the circular waveguide;
    a funnel-shaped horn adjoining an open end of the circular waveguide, the radius of the horn increasing in a direction facing away from the circular waveguide; and
    an insert made of a dielectric,
        the insert having a first cylindrical section which fills the circular waveguide, and
        the insert having a conical section whose tip points n the direction facing away from the circular waveguide and
        whose base area has a diameter which is greater than a diameter of the cylindrical section.

2. The antenna as claimed in claim 1, in which the horn is at distance form the conical section in the radial direction.

3. The antenna as claimed in claim 2, in which the conical section has in the axial direction a length which is approximately equal to the wavelength of microwaves to be transmitted in free space.

4. The antenna as claimed in claim 1, in which a second cylindrical section is arranged between the first cylindrical section and the conical section and the diameter of said second cylindrical section is equal to the diameter of the base area of the conical section.

5. The antenna as claimed in claim 4, in which the conical section has in the axial direction a length which is approximately equal to the wavelength of microwaves to be transmitted in free space.

6. The antenna as claimed in claim 1, in which the conical section has in the axial direction a length which is approximately equal to the wavelength of microwaves to be transmitted in free space.

* * * * *